(12) United States Patent
Gruber

(10) Patent No.: US 6,828,008 B2
(45) Date of Patent: Dec. 7, 2004

(54) ADHESIVE TAPE FOR MASKING

(76) Inventor: George Gruber, 10823 Pawnee Ave. N., Stillwater, MN (US) 55082

( * ) Notice: Subject to any disclaimer, the term of this patent is extended or adjusted under 35 U.S.C. 154(b) by 0 days.

(21) Appl. No.: 10/138,683

(22) Filed: May 3, 2002

(65) Prior Publication Data
US 2003/0207085 A1 Nov. 6, 2003

(51) Int. Cl.[7] .............................. B05D 1/32; B32B 3/14
(52) U.S. Cl. ....................... 428/192; 428/343; 428/152; 428/194; 428/906; 118/504; 118/505; 427/282
(58) Field of Search ................................. 428/343, 152, 428/192, 906, 194; 118/504, 505; 427/282

(56) References Cited

U.S. PATENT DOCUMENTS

| | | | | |
|---|---|---|---|---|
| 1,683,453 A | * | 9/1928 | Farrel | ........................... 428/350 |
| 2,654,684 A | * | 10/1953 | Heikin | ................... 428/311.71 |
| 3,032,181 A | * | 5/1962 | Hutter et al. | ................ 428/192 |
| 4,042,739 A | | 8/1977 | Emal et al. | |
| 4,703,997 A | * | 11/1987 | Ijiri et al. | .................... 385/109 |
| 4,867,526 A | * | 9/1989 | Arroyo | ......................... 385/107 |
| 5,415,923 A | * | 5/1995 | Sarokin et al. | ................ 442/68 |
| 6,124,520 A | | 9/2000 | Roberts | |
| 6,124,521 A | | 9/2000 | Roberts | |
| 6,162,959 A | | 12/2000 | O'Connor | |
| 6,168,831 B1 | | 1/2001 | Khan et al. | |
| 6,173,100 B1 | * | 1/2001 | Newton et al. | .............. 385/102 |
| 6,284,319 B1 | | 9/2001 | Langeman | |
| 2002/0168514 A1 | * | 11/2002 | Wright | ........................ 428/343 |

OTHER PUBLICATIONS

George Clapperton, 1926, p. 76–77, "Practical Paper–Making".

* cited by examiner

Primary Examiner—William P. Watkins, III
(74) Attorney, Agent, or Firm—Leffert Jay & Polglaze,P.A.

(57) ABSTRACT

An absorbent edge coating for masking tape and other masking materials is herein disclosed. A masking tape according to the present invention comprises a substrate having a top surface, a bottom surface, and at least one masking edge. The bottom surface of the substrate has an adhesive layer applied thereto. An absorbent edge coating is applied to at least one masking edge of the substrate so as to at least substantially prevent liquids addressed to the at least one coated masking edge from being absorbed into the substrate of the tape and from passing between the bottom surface of the tape and a surface to which the tape has been applied.

28 Claims, 1 Drawing Sheet

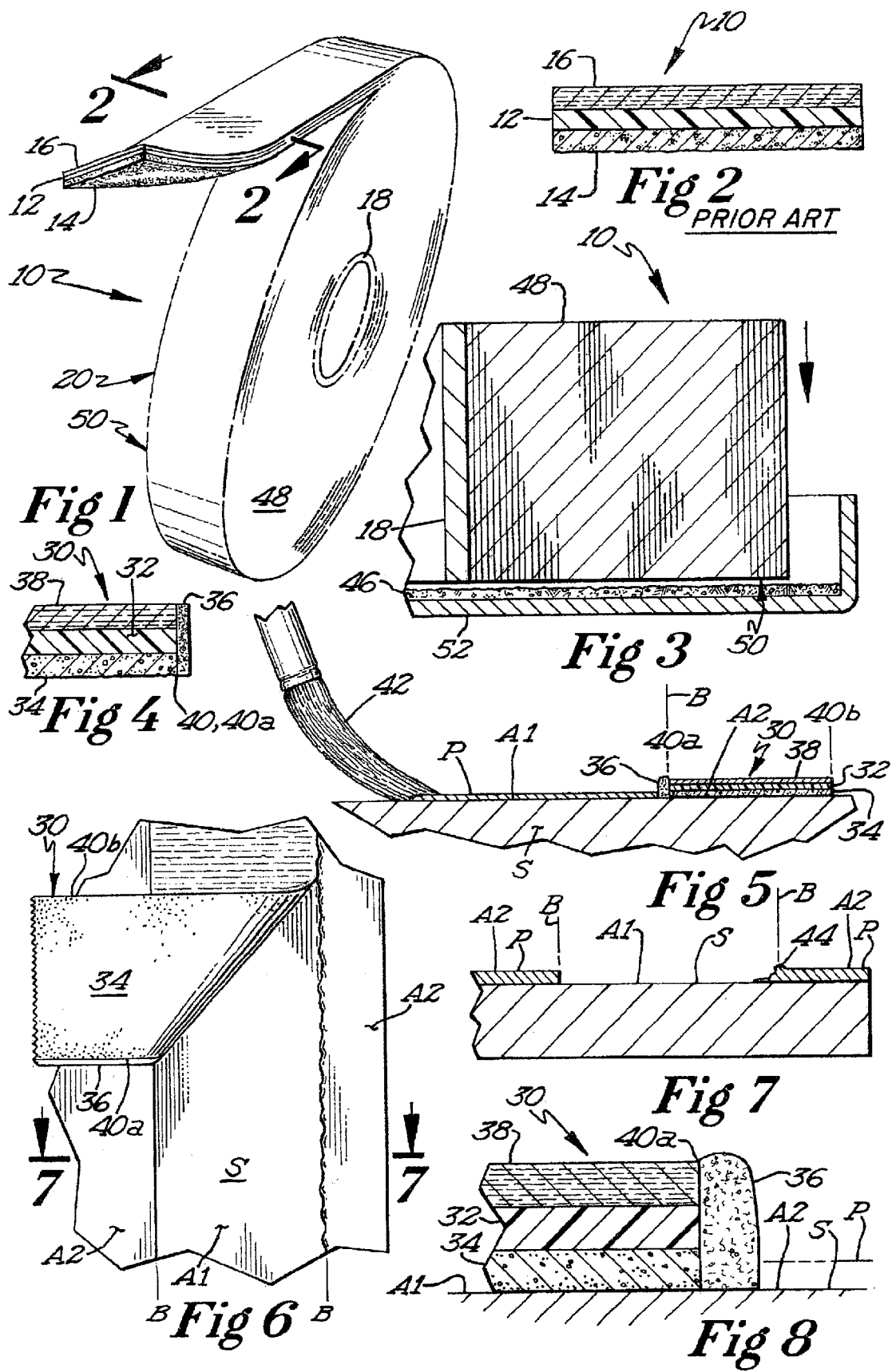

ns,008 B2

ADHESIVE TAPE FOR MASKING

FIELD OF THE INVENTION

The present invention relates to an improved adhesive tape having an edge coating. More specifically, the present invention relates to an edge coating for masking tape and other masking materials that improves the masking ability of those materials.

BACKGROUND OF THE INVENTION

Adhesive tapes for masking are typically comprised of a paper substrate having an adhesive layer applied to a bottom surface thereof. In addition, some masking tapes have an upper, liquid-resistant, or liquid-proof layer applied to an upper surface of the substrate. A persistent problem with masking tapes of this type is that the tape is typically only partially successful in defining a clean masking edge or boundary between masked and unmasked surfaces. For example, when an unmasked surface is painted, it is common for paint to work its way into gaps between the adhesive layer of the tape and the surface to which the tape is applied. In addition, the paper substrate has a tendency to absorb or wick moisture from the paint through the unprotected edge of the tape substrate. This absorption causes swelling in the tape that degrades the ability of the tape to form a tight seal with the surface to which it is applied.

Yet another problem associated with masking tape and other, similar masking products is that paint that overlies the edge of the tape will cure in place and make it difficult to remove the tape from beneath the edge of the layer of cured paint. In these circumstances, tape can tear or worse, remove portions of the cured paint, thereby necessitating touch up of the painted surface.

Accordingly, it is an objective of the present invention to provide an edge coating that eliminates or at least minimizes the movement of paint or other liquids past a boundary defined by a masking edge of an adhesive tape or other masking product. It is another object of the present invention to provide an absorbent edge coating that will prevent or at least minimize liquids from being wicked into the substrate of an adhesive tape or other masking product. A final objective of the present invention is to provide an edge coating for an adhesive tape or other masking product that retards the curing of paints or other coatings applied to a surface at a boundary between an unmasked area and a masked area of a surface, thereby facilitating the clean release of the adhesive tape or masking product from the surface to which it is applied.

These and other objectives and advantages of the invention will appear more fully from the following description, made in conjunction with the accompanying drawings wherein like reference characters refer to the same or similar parts throughout the several views.

SUMMARY OF THE INVENTION

The objects of the present invention are realized in a masking tape having a substrate with a top surface, a bottom surface, a first edge, and a second edge. The bottom surface of the substrate has an adhesive layer applied thereto and at least one of the edges of the substrate, also referred to as a masking edge, has an absorbent edge coating that substantially prevents liquids addressed thereto from being absorbed into the substrate of the tape and from passing between the bottom surface of the tape and a surface to which the tape has been applied. The edge coating is preferably a super absorbent polymer and has an absorbency that is greater than that of the substrate of the tape. In this manner, the edge coating reduces or substantially prevents the absorption of liquids into the substrate and also prevents the movement of the liquids beneath the tape. The super absorbent polymers of the edge coating also absorb and retain excess liquids addressed to the coated edge in such a manner as to retard the curing of the liquids. By retarding the curing of the liquids at the edge of the substrate, the absorbent edge coating facilitates the clean release of the tape from the surface to which it has been applied and from the remaining liquid applied to the surface.

Preferably, the substrate of the tape will be fashioned of a paper product such as a paper crepe ribbon though it is envisioned that the tape may also be fashioned from polyethylene, polyester, or other synthetic materials as well. To further prevent the absorption of the liquids into the substrate of the tape, a liquid resistant layer may be applied to the top surface of the substrate of the tape. Alternatively, a liquid-proof layer applied to the top surface of the substrate of the tape.

The present invention may also be characterized as an improved masking tape for defining a boundary between a masked area of a surface and an unmasked area of the surface. Such a masking tape comprises an elongate substrate having a top surface, a bottom surface, and at least one masking edge. An adhesive layer is applied to the bottom surface of the substrate for adhering the masking tape to the surface. An absorbent edge layer is also applied to at least one masking edge of the substrate to at least substantially prevent or minimize liquids applied to the unmasked area of the surface from moving past the boundary on the surface that is defined by the at least one edge of the substrate to which the absorbent edge layer is applied. Preferably the absorbent edge layer will be a super absorbent polymer capable of absorbing water, oil based paint, latex paint, stains, glazes, dyes, cleaning compounds, strippers, and solvents. Furthermore, the absorbent edge layer applied to the at least one masking edge is able to absorb and retain liquids applied thereto in such a manner as to retard the curing of the liquid located at the boundary.

The present invention may comprise a roll of tape or a masking article that has had an absorbent edge coating applied during the original manufacturing process, or may comprise an absorbent edge coating that is applied to a roll of tape or to a masking article immediately prior to its use. A method of manufacturing an adhesive tape that includes an absorbent edge coating begins with the step of providing a substrate that has a top surface and a bottom surface. An adhesive layer is applied to the bottom surface of the substrate. The substrate is subsequently rolled onto a cylindrical core and cut into discrete rolls. The absorbent material that makes up the edge coating is applied to at least one cut edge of the discrete rolls such that the absorbent material is adhered to the edge of the substrate exposed on the cut edge of the roll by the adhesive layer applied to the bottom surface of the substrate.

A roll of tape constructed and arranged according to the present invention and having a top, a bottom, and a masking edge with a predetermined shape and an absorbent layer applied thereto is employed in masking off a first area of a surface from a second area of the surface by applying the tape to the surface such that the masking edge of the tape is coincident with the boundary between the first and second areas of the surface. An adhesive layer applied to the bottom surface of the tape adheres the tape to the surface to which it is applied. The absorbent layer on the masking edge of the tape is preferably a super absorbent polymer.

The present invention may also be embodied in various masking materials used to define a boundary between a masked area of a surface and an unmasked area of the surface. Such masking materials comprise a substrate having a top surface, a bottom surface, at least one edge, an adhesive layer applied to at least a portion of the bottom surface of the substrate for adhering the masking material to the surface, and an absorbent edge layer that is applied to the at least one edge of the substrate. The absorbent edge layer at least substantially prevents liquids applied to the unmasked area of the surface from moving past the boundary on the surface that is defined by the at least one edge of the substrate to which the absorbent edge layer is applied. Again, its is preferred that the absorbent edge layer be made of a super absorbent polymer. These super absorbent polymers absorb and retain liquids applied to the surface in such a manner as to retard the curing of the liquid absorbed, thereby facilitating the clean release of the edge of the tape from the surface to which it has been applied and from the remaining liquid applied to the surface.

The absorbent edge coating may also be employed with a roll of tape that is to be applied for masking purposes with a bi-directional tape dispensing device that is capable of applying tape around and into the corners of a first surface wherein the first surface may be adjacent to a second surface. When so employed, such a tape dispensing device may comprise a frame having an alignment member extending from the frame and a hub rotatably attached to the frame and adapted for receiving a roll of tape. As will be appreciated the roll of tape will comprise an elongate substrate having a top surface, a bottom surface, and at least one masking edge. An adhesive layer is applied to the bottom surface of the substrate for adhering the tape to one of the first and second surfaces, and an absorbent edge layer applied to the at least one masking edge of the substrate to at least substantially prevent liquids applied to one of the first and second surfaces from moving past a boundary on the first or second. The boundary is defined by the at least one masking edge of the substrate to which the absorbent edge layer is applied. The roll of tape is received by the hub such that the at least one masking edge of the tape is aligned with an outer edge of the alignment member. Furthermore, the roll of tape may be pressed onto the hub with the at least one masking edge of the roll of tape being oriented on the bi-directional tape dispenser independent of a width of the roll of tape and with no dependency on an inner edge of the roll of tape.

DESCRIPTION OF THE DRAWINGS

FIG. 1 is a perspective view of a typical roll of masking tape;

FIG. 2 is a cross sectional view of a prior art masking tape taken along cutting lines 2—2 illustrating schematically the multiple layers thereof;

FIG. 3 is a cross sectional view of a roll of masking tape having an absorbent edge coating applied to a cut edge thereof;

FIG. 4 is a partial cross sectional view of a masking tape having an absorbent edge coating of the present invention;

FIG. 5 is a schematic cross sectional view of the masking tape of FIG. 4 illustrating one manner in which the masking tape may be used;

FIG. 6 is a partial plan view of a surface that had been masked with a masking tape having an absorbent edge coating on one edge and another edge without such a coating;

FIG. 7 is a cross sectional view of the surface of FIG. 6 taken along cutting lines 7—7; and, FIG. 8 is a close up partial cross sectional view of a masking tape of the present invention illustrating how the absorbent edge coating expands to absorb liquids applied to the surface to which the masking tape is applied.

DETAILED DESCRIPTION

Although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

FIG. 2 illustrates a cross section of a standard, prior art adhesive tape 10 of a type commonly used for masking. Tape 10 has a middle layer or substrate 12 and an adhesive layer 14 applied to a bottom surface of the substrate 12. In some instances, tape 10 may have a top layer 16 applied to a top surface of the substrate 12 that is impervious or at least resistant to liquids. Tape 10 is most often wound on a core 18 to form a roll 20 as illustrated in FIG. 1.

The present invention comprises an adhesive tape 30 as illustrated in FIGS. 3 and 4. Tape 30 has a substrate 32, an adhesive layer 34, and an edge coating 36.

Tape 30 may also comprise an optional liquid proof or liquid resistant top layer 38. The edge coating 36 may be applied to one or both edges of the tape 30 and comprises an absorbent material that acts to prevent or at least minimize the absorption of liquids into the tape substrate 32 and the ingress of liquids between the adhesive layer 34 and a surface to which the tape has been applied.

The edge coating or edge layer 36 preferably has super-absorbent properties such that the edge coating can absorb many times its own weight in liquids brought into contact with the edge 40 of the tape 30. At the very least, the edge coating 36 will have a greater absorbency than the substrate 32 of the tape 30 and will tend to draw liquids from the substrate 32 and will reduce or prevent the absorption of liquids into the substrate 32. The absorbency of the edge coating 36 also acts to overcome the capillary action that can draw liquids such as paint beneath the tape.

Super-absorbent materials are well known for their use in diapers, as soil replacements, fire retardants, and in cabling applications. Super-absorbent materials are also used in the absorption and solidification of various types of wastewaters and sludges, including radioactive waste. Super-absorbent materials are typically solid, granular cross-linked polyacrylate polymers that rapidly absorb and retain large volumes of aqueous and other types of solutions and liquids. While virtually any type of super-absorbent material may be used in conjunction with the present invention, sodium polyacrylate has proven to be particularly useful. Sodium polyacrylate is a chemical that consists of very long carbon chains that are bonded together with sodium atoms found in the center of the molecule. This structure, through osmosis, is able to absorb and retain many times its own weight. The liquids absorbed by a super-absorbent material are entirely encapsulated within the long chain molecule that makes up the super-absorbent material and these liquids are only slowly released therefrom. This slow release, coupled with the complete encapsulation of the liquids, retards the curing of liquids such as paint.

Other super-absorbent materials that are available today and which may be used with the present invention include, but are not limited to cellulosic or starch-graft copolymers and synthetic super-absorbent materials made from polyacrylic acids, polymaleic anhydride-vinyl monomers, polyvinyl alcohols, and polyacrylonitrile.

As tape 30 may be used in many different masking applications, including, but not limited to painting, staining, glazing, shellacking, varnishing, lacquering, cleaning, and stripping, the edge coating 36 of tape 30 may be called on to absorb many different types of liquids to prevent these liquids from being absorbed by the substrate 32 of tape 30 or entering between the adhesive layer 34 and a surface S to which the tape 30 has been applied. Liquids that may be absorbed by the edge coating 36 may include, but are not limited to, paint (oil, latex, milk, whitewash etc.), shellac, varnish, lacquer, thinners, cleaners, strippers, water, and solvents of many types. The term "liquids" as used herein is to be construed broadly to include all of the aforementioned substances as well as any other substances, liquid or merely viscous, whose use may require the use of masking tape or other masking products.

FIG. 5 illustrates how tape 30 may be used in a painting application. In FIG. 5, tape 30 has been adhered to a surface S such that its left edge 40a is coincident with a boundary B between a first, unmasked area A1 and a second, masked area A2. Paint P is applied with a brush 42 to the unmasked area A1. Paint P is applied right up to and at times over boundary B thereby covering substantially all of area A1. When paint P reaches the boundary B formed by the edge 40 of the tape 30, the liquid paint P at the edge 40 of the tape that would otherwise be absorbed by the substrate of the tape 30 or pass between the tape 30 and the surface S is absorbed by the edge coating 36 of tape 30. Note that in the Figures, edge coating 36 is not illustrated to scale and therefore it is to be appreciated that though the super-absorbent materials from which the edge coating 36 are made will swell when liquids such as paint P are absorbed, the expanded edge coating 36 does not expand significantly away from the edge 40 of the tape 30 and will not mar the final finish of the paint P. This result is best seen in FIGS. 6 and 7.

The super absorbent materials of the edge coating 36 retain the paint P away from the atmosphere such that the paint P within the edge coating 36 does not fully cure. Indeed, the paint P at the boundary B defined by the coated edge 40a of the tape 30 is also kept somewhat uncured by the slow release of the uncured paint P and its solvents that had previously been absorbed by the edge coating 36. Consequently, the less-than-fully cured paint P at the boundary B will cleanly release from the tape 30 when the tape 30 is removed from the surface S. This also results in clean, linear, and smooth boundary B between the masked and unmasked areas of surface S.

FIGS. 6 and 7 depict results obtained with a standard adhesive tape 30 of a type commonly used for masking having one coated edge 40a and one uncoated edge 40b. As can be seen from FIG. 6 (and FIG. 7) the left boundary B formed by the coated edge 40a of tape 30 is linear and smooth whereas the right boundary B formed by the uncoated edge 40b of tape 30 is jagged and irregular. FIG. 8 illustrates close up how the edge coating 36 of tape 30 absorbs the paint P as the paint P contacts the edge coating 36. Conversely, the uncoated edge 40b of tape 30 permits excess paint P to work its way onto the masked area A2 beneath the adhesive layer 34, to be absorbed into the substrate 32 of the tape 30 and to form a bead 44 of dried paint over the boundary B and onto the upper layer 38 of the tape 30.

FIG. 3 illustrates one method of applying an edge layer 36 of super absorbent materials 46 to a roll 20 of tape 10, 30. Tape 10, 30 is typically formed in large sheets (not shown) many times wider than the roll illustrated in FIGS. 1 and 3. These sheets of tape 10, 30 are rolled onto an elongate core (not shown) to form an elongate roll of tape 10, 30. The elongate roll of tape 10, 30 is then cut into rolls 20 of predetermined widths. The cut sides 48, 50 of the rolls 20 of tape 10, 30 have adhesive from the adhesive layers 14, 34 exposed thereon. The side or sides 48, 50 of each roll 20 of tape are then pressed into a quantity of super absorbent material 46 that has been previously deposited in a container 52. The grains of the super absorbent material 46 are adhered to the edges 40 of the tape 10, 30 by the adhesive of the adhesive layers 14, 34 of the tape. While the super absorbent material 46 may occasionally be applied to the sides 48, 50 of the rolls 20 of tape in an inconsistent manner, it must be remembered even a small amount of the supper absorbent material 46 is needed to enable the present invention. It is to be understood that other, alternative methods may be employed to apply the super absorbent materials 46 to the edges 40 of the tape 10, 30. These methods may include, but are not limited to, spraying, dipping, sprinkling, or painting the super absorbent materials onto the tape 10, 30.

The present invention may be readily employed with masking products and devices other than masking tapes having an absorbent substrate. The present invention may be beneficially employed with adhesive tapes having polyethylene, polyester, or other synthetic substrates. These adhesive tapes may or may not further comprise a liquid-proof or liquid-resistant top layer or coating. In addition to adhesive tapes, it is to be understood that paper or synthetic drop cloths or masking sheets may also benefit from the present invention. Paper and synthetic drop cloths or masking sheets are thin sheets of material that are used in masking large areas during such operations as painting and cleaning with solvents. These drop cloths and masking sheets are typically much wider than the adhesive tapes used in masking objects and may have adhesives over their entire bottom surface, over only a portion of their bottom surface, or not at all.

While it is preferred to apply an edge coating 36 to a roll 20 of tape 30 prior to the sale of the tape 30 in the normal course of trade, it is to be further understood that super absorbent materials 46 may be applied to virtually any adhesive tape or other masking product at a work site. In this case, the super absorbent materials 46 would be placed in a container and applied to the adhesive tape or other masking materials as needed. An additional benefit of the present invention is that the addition of an absorbent edge coating 36 to any adhesive tape, expensive or cheap, will greatly enhance the performance of that tape.

Tape 30 may be applied by hand, as where a user of the tape manually adheres the tape 30 to a surface such that at least one masking edge of the tape is coincident with a boundary between an unmasked area A1 and a masked area A2. Alternatively, tape 30 may be applied using a tape dispensing mechanism such as that described in U.S. Pat. No. 6,302,177 issued to the inventor of the present invention on Oct. 16, 2001. U.S. Pat. No. 6,302,177 is hereby incorporated by reference.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A tape for masking comprising:
    a substrate having a top surface, a bottom surface, and at least one masking edge, the bottom surface of the substrate having an adhesive layer applied thereto, and
    an absorbent edge coating applied to substantially only the at least one masking edge to at least substantially prevent liquids addressed to the at least one coated masking edge from being absorbed into the substrate of the tape and from passing between the bottom surface of the tape and a surface to which the tape has been applied.

2. The tape of claim 1 wherein the absorbent edge coating is a super absorbent polymer.

3. The tape of claim 1 wherein the absorbent edge coating absorbs and retains liquids addressed to the at least one masking edge in such a manner as to retard the curing of the liquids adjacent the at least one masking edge and thereby facilitating the clean release of the tape from a surface to which the tape has been applied and from the liquid applied to the surface.

4. The tape of claim 1 wherein the absorbent edge layer has a greater absorbency than the substrate of the tape.

5. The tape of claim 1 wherein the substrate is a paper.

6. The tape of claim 5 wherein the substrate is a crepe ribbon.

7. The tape of claim 1 wherein the substrate is fashioned of one of a group consisting of polyethylene and polyester.

8. The tape of claim 1 further comprising a liquid resistant layer applied to the top surface of the substrate of the tape.

9. The tape of claim 1 further comprising a liquid proof layer applied to the top surface of the substrate of the tape.

10. An improved masking tape for defining a boundary between a masked area of a surface and an unmasked area of the surface, the masking tape comprising:
    an elongate substrate having a top surface, a bottom surface, and at least one masking edge;
    an adhesive layer applied to the bottom surface of the substrate for adhering the masking tape to the surface; and,
    an absorbent edge layer applied to substantially only the at least one masking edge of the substrate to at least substantially prevent liquids applied to the unmasked area of the surface from moving past the boundary on the surface that is defined by the at least one masking edge of the substrate to which the absorbent edge layer is applied.

11. The tape of claim 10 wherein the absorbent edge layer acts to at least substantially prevent the movement of liquids chosen from the group consisting of oil based paint, latex paint, milk paint, whitewash, stains, glazes, dyes, cleaning compounds, strippers, water and solvents.

12. The tape of claim 10 wherein the absorbent edge layer has a greater absorbency than the substrate of the tape.

13. The tape of claim 10 wherein the absorbent edge layer absorbs and retains a liquid applied to the surface in such a manner as to retard the curing of the liquid located at the boundary.

14. The tape of claim 10 wherein the substrate is fashioned from paper.

15. The tape of claim 14 wherein the substrate is a paper crepe ribbon.

16. The tape of claim 10 wherein the substrate is fashioned of one of a group comprising polyethylene and polyester.

17. The tape of claim 10 further comprising a liquid resistant layer applied to the top surface of the substrate of the tape.

18. The adhesive tape of claim 10 wherein the edge coating is a super absorbent polymer.

19. A method of masking of a first area of a surface from a second area of a surface comprising the steps of:
    providing a tape having a top, a bottom, and a masking edge having a predetermined shape, the masking edge of the tape having an absorbent layer applied substantially only thereto, the bottom surface having an adhesive applied thereto; and,
    applying the tape to the surface such that the masking edge of the tape is coincident with the boundary between the first and second areas of the surface.

20. The method of masking of claim 19 wherein the absorbent layer is a super absorbent polymer.

21. A masking material for defining a boundary between a masked area of a surface and an unmasked area of the surface, the masking material comprising:
    a substrate having a top surface, a bottom surface, and at least one edge;
    an adhesive layer applied to at least a portion of the bottom surface of the substrate for adhering the masking material to the surface; and,
    an absorbent edge layer applied substantially only to the at least one edge of the substrate to at least substantially prevent liquids applied to the unmasked area of the surface from moving past the boundary on the surface that is defined by the at least one edge of the substrate to which the absorbent edge layer is applied.

22. The masking material of claim 21 wherein the absorbent edge layer is a super absorbent polymer.

23. The tape of claim 21 wherein the absorbent edge layer absorbs and retains a liquid applied to the surface in such a manner as to retard the curing of the liquid, thereby facilitating the clean release of the edge of the tape from the surface to which it has been applied and from the remaining liquid applied to the surface.

24. An improved masking tape for defining a boundary between a masked area of a surface and an unmasked area of the surface, the masking tape comprising:
    an elongate substrate having a top surface, a bottom surface, and at least one masking edge;
    an adhesive layer applied to the bottom surface of the substrate for adhering the masking tape to the surface; and,
    an absorbent edge layer applied to substantially only the at least one masking edge of the substrate to minimize the movement of liquids applied to the unmasked area of the surface past the boundary on the surface that is defined by the at least one masking edge of the substrate to which the absorbent edge layer is applied.

25. An improved masking tape for defining a boundary between a masked area of a surface and an unmasked area of the surface, the masking tape comprising:
    an elongate substrate having a top surface, a bottom surface, and a masking edge;
    an adhesive layer applied to the bottom surface of the substrate for adhering the masking tape to the surface; and,
    a super-absorbent polymer coating applied only to the masking edge of the substrate to at least substantially prevent liquids applied to the unmasked area of the surface from moving past the boundary on the surface that is defined by the masking edge of the substrate to which the super-absorbent polymer coating is applied.

26. An improved masking tape for defining a boundary between a masked area of a surface and an unmasked area of the surface, the masking tape comprising:

an elongate substrate having a top surface, a bottom surface, and a masking edge;

an adhesive layer applied to the bottom surface of the substrate for adhering the masking tape to the surface; and, a super-absorbent polymer coating applied only to the masking edge of the substrate to at least substantially prevent liquids applied to the unmasked area of the surface from moving past the boundary on the surface that is defined by the masking edge of the substrate to which the super-absorbent polymer coating is applied, the super-absorbent polymer coating absorbing and retaining a liquid applied to the unmasked area of the surface in such a manner as to retard the curing of the liquid, thereby facilitating the clean release of the masking edge of the substrate from the surface to which it has been applied and from the remaining liquid applied to the surface.

27. The improved masking tape of claim 26 wherein the liquid applied to the unmasked surface is selected from a group consisting oil based paint, latex paint, milk paint, whitewash, stains, glazes, dyes, cleaning compounds, strippers, water and solvents.

28. The improved masking tape of claim 26 wherein the liquid applied to the unmasked surface is a paint and wherein the super-absorbent polymer edge coating retards the curing of the paint at the boundary sufficiently long to allow the remaining paint to cure before the masking tape is removed from the surface to which it was applied.

* * * * *